(12) United States Patent
Vawter et al.

(10) Patent No.: US 10,186,046 B2
(45) Date of Patent: *Jan. 22, 2019

(54) NAVIGATION BASED ON DOWNWARD FACING SENSORS

(71) Applicant: Kitty Hawk Corporation, Mountain View, CA (US)

(72) Inventors: Zachais Vawter, Sunnyvale, CA (US); Mark Johnson Cutler, Sunnyvale, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/879,186

(22) Filed: Jan. 24, 2018

(65) Prior Publication Data

US 2018/0165817 A1    Jun. 14, 2018

Related U.S. Application Data

(63) Continuation of application No. 15/198,275, filed on Jun. 30, 2016, now Pat. No. 9,911,189.

(51) Int. Cl.
*G06T 7/33* (2017.01)
*G01S 17/89* (2006.01)
(Continued)

(52) U.S. Cl.
CPC .............. *G06T 7/33* (2017.01); *B64C 39/024* (2013.01); *B64D 47/08* (2013.01); *G01S 17/08* (2013.01);
(Continued)

(58) Field of Classification Search
CPC . G06T 7/33; G06T 7/004; G01S 17/89; G01S 17/08; G06F 17/30241;
(Continued)

(56) References Cited

U.S. PATENT DOCUMENTS

| 5,831,876 A * | 11/1998 | Orr .......................... G06T 17/05 703/6 |
| 7,920,943 B2 * | 4/2011 | Campbell ............ G05D 1/0676 244/75.1 |

(Continued)

OTHER PUBLICATIONS

Dr. Richard Szeliski, Chapter 4: "Feature detection and matching", from Computer Vision: Algorithms and Applications, Sep. 7, 2009 draft.

(Continued)

*Primary Examiner* — Jaime Figueroa
(74) *Attorney, Agent, or Firm* — Van Pelt, Yi & James LLP

(57) ABSTRACT

Sensor information is obtained from a downward facing sensor coupled to an aircraft. A new position is determined using the sensor information, including by: obtaining directional information associated with the aircraft's direction of flight, obtaining a previous position associated with the aircraft, filtering a plurality of datasets in a ground feature database using the directional information and the previous position in order to obtain a reduced group of datasets (where each dataset in the ground feature database is associated with a known in-air position), and comparing the sensor information against the reduced group of datasets in order to determine the new position.

15 Claims, 13 Drawing Sheets

(51) Int. Cl.
 B64D 47/08 (2006.01)
 B64C 39/02 (2006.01)
 G06K 9/00 (2006.01)
 G06K 9/62 (2006.01)
 G06F 17/30 (2006.01)
 G01S 17/08 (2006.01)
 G06T 7/00 (2017.01)
(52) U.S. Cl.
 CPC ........ *G01S 17/89* (2013.01); *G06F 17/30241* (2013.01); *G06K 9/0063* (2013.01); *G06K 9/6202* (2013.01); *G06T 7/004* (2013.01)
(58) Field of Classification Search
 CPC .... B64D 47/08; B64C 39/024; G06K 9/6202; G06K 9/0063
 USPC ........................................................ 701/1.3
 See application file for complete search history.

(56) References Cited

U.S. PATENT DOCUMENTS

| | | | | |
|---|---|---|---|---|
| 8,515,600 | B1* | 8/2013 | McCusker | G01S 13/94 701/9 |
| 8,917,191 | B1* | 12/2014 | Tiana | G01C 23/00 340/945 |
| 9,354,633 | B1* | 5/2016 | McCusker | G05D 1/0022 |
| 9,384,586 | B1* | 7/2016 | McCusker | G08G 5/0021 |
| 9,733,349 | B1* | 8/2017 | Wood | G01S 13/953 |
| 2008/0119970 | A1* | 5/2008 | Campbell | G05D 1/0676 701/8 |
| 2012/0120069 | A1* | 5/2012 | Kodaira | G06F 17/30271 345/419 |
| 2012/0271546 | A1* | 10/2012 | Pyne | G01C 21/20 701/443 |
| 2014/0022262 | A1* | 1/2014 | Mohr | G01C 11/00 345/501 |
| 2016/0282120 | A1* | 9/2016 | Wang | G01C 23/00 |

OTHER PUBLICATIONS

Levinson et al., "Robust Vehicle Localization in Urban Environments Using Probabilistic Maps", from 2010 IEEE International Conference on Robotics and Automation, Anchorage, Alaska, May 3-8, 2010.

* cited by examiner

200

| La | Lo | Al |
|---|---|---|
| - | - | - |
| - | - | 0 |
| - | - | + |
| - | 0 | - |
| - | 0 | 0 |
| - | 0 | + |
| - | + | - |
| - | + | 0 |
| - | + | + |

| La | Lo | Al |
|---|---|---|
| 0 | - | - |
| 0 | - | 0 |
| 0 | - | + |
| 0 | 0 | - |
| 0 | 0 | 0 |
| 0 | 0 | + |
| 0 | + | - |
| 0 | + | 0 |
| 0 | + | + |

| La | Lo | Al |
|---|---|---|
| + | - | - |
| + | - | 0 |
| + | - | + |
| + | 0 | - |
| + | 0 | 0 |
| + | 0 | + |
| + | + | - |
| + | + | 0 |
| + | + | + |

202

| | |
|---|---|
| La = - | Latitude is expected to decrease |
| La = 0 | Latitude is expected to remain constant |
| La = + | Latitude is expected to increase |
| Lo = - | Longitude is expected to decrease |
| Lo = 0 | Longitude is expected to remain constant |
| Lo = + | Longitude is expected to increase |
| Al = - | Altitude is expected to decrease |
| Al = 0 | Altitude is expected to remain constant |
| Al = + | Altitude is expected to increase |

FIG. 2

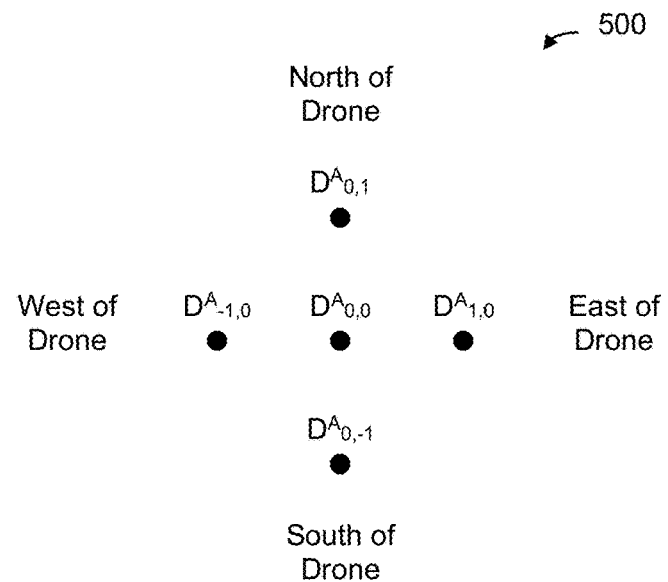
Distance Dataset for Known Position A in Ground Feature Database
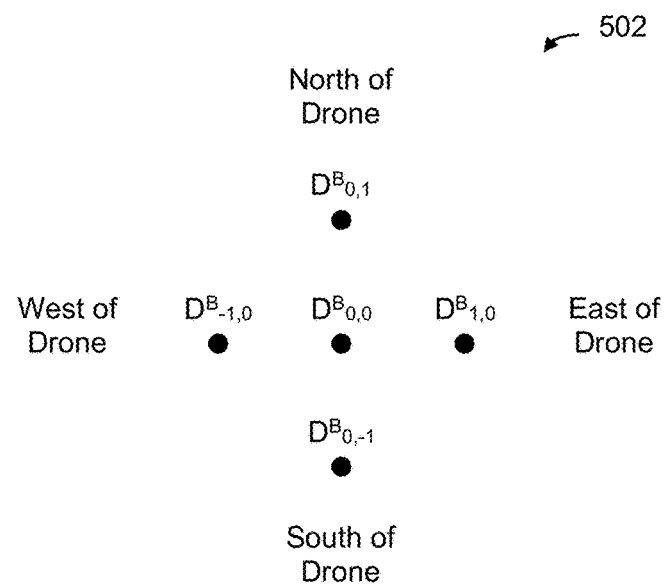
Distance Dataset for Known Position B in Ground Feature Database
FIG. 5

NAVIGATION BASED ON DOWNWARD FACING SENSORS

CROSS REFERENCE TO OTHER APPLICATIONS

This application is a continuation of co-pending U.S. patent application Ser. No. 15/198,275, entitled NAVIGATION BASED ON DOWNWARD FACING SENSORS filed Jun. 30, 2016 which is incorporated herein by reference for all purposes.

BACKGROUND OF THE INVENTION

Aircraft, such as drones, constantly need to determine their in-air position. Although GPS systems are a popular solution to this problem, in some cases, GPS is insufficient and/or unattractive. For example, in an urban canyon environment (e.g., where the aircraft is surrounded by tall buildings), the accuracy of GPS decreases significantly. In particular, GPS is not as accurate in determining altitude as it is with latitude and longitude. Some other techniques for determining altitude (e.g., using barometers) do not work well in applications when the propellers and/or rotors disturb the barometers. Having equipment which can accurately and reliably determine altitude is an important ability in aircrafts. Therefore, new techniques for determining an in-air position (e.g., without using GPS and/or barometers) would be desirable.

BRIEF DESCRIPTION OF THE DRAWINGS

Various embodiments of the invention are disclosed in the following detailed description and the accompanying drawings.

FIG. 2 is a diagram illustrating an embodiment of control settings which may be used to determine a new area in a ground feature database to search.

FIG. 5 is a diagram illustrating an embodiment of two distance datasets stored in a ground feature database.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
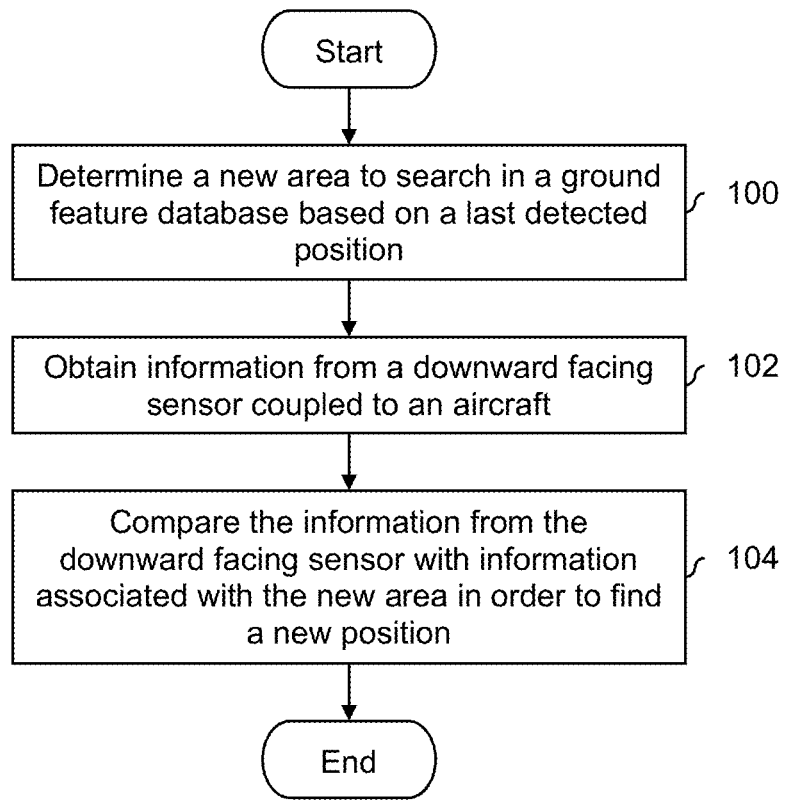
FIG. 1 is a flowchart illustrating an embodiment of a process to determine the in-air position of an aircraft.

FIG. 1 is a flowchart illustrating an embodiment of a process to determine the in-air position of an aircraft. In some embodiments, all of the steps described here are performed by the aircraft. Alternatively, at least some of the steps described herein may be performed by some other device or system external to the aircraft (e.g., to conserve the aircraft's power, such as when the aircraft is battery powered, and/or to permit high-performance and/or specialized hardware to perform the computations).

At 100, a new area to search in a ground feature database is determined based on a last detected position. Generally speaking, a ground feature database stores known and/or historic information about features on the ground. In some embodiments, the ground feature databased includes or is obtained from publicly-available data, such as satellite images or topographical and city data. In some embodiments, each set of data in the ground feature database is associated with a known in-air position (e.g., from which that image was taken or a set of one or more distance(s) was measured). From this comparison, the in-air position of the aircraft is determined.

Generally speaking, step 100 narrows down the information from a ground feature database which is subsequently evaluated and/or processed based on the last detected position. For example, based on the last detected position and the direction in which the aircraft is directed to fly (e.g., known or otherwise obtained from one or more control settings of the aircraft), likely or probable in-air positions of the aircraft may be determined. For example, if the aircraft is instructed to rise directly upwards, then the altitude of the aircraft is expected to increase but the latitudes and longitudes are expected to remain substantially the same. Information from the ground feature database which corresponds to new in-air positions which are plausible or likely given the last detected position and the direction in which the aircraft is directed to fly may be selected at step 100. To continue the above example, information measured from or taken from in-air positions with a higher altitude but substantially the same latitude and longitude as the last detected position may be selected from the ground feature database.

At 102, information is obtained from a downward facing sensor coupled to an aircraft. In one example, the downward facing sensor is a Lidar system which uses a laser to measure distances to points or things on the ground. In some such embodiments, the ground feature database may store a variety of distance datasets, where each distance dataset is a collection of distances to various ground points (e.g., associated with predefined angles in some fixed orientation or direction) measured or otherwise taken from some known in-air position. In another example, the downward facing sensor is a camera and the ground feature database stores images taken from various known in-air positions.

At 104, the information from the downward facing sensor is compared with information associated with the new area in order to find a new position. For example, the set of data from the ground feature database that best matches the information from the downward facing sensor may be selected. In some embodiments, the known in-air position associated with the selected dataset is output as the new position. In some embodiments, some extrapolation or interpolation (e.g., between known in-air positions for which there is data in the ground feature database) is performed and that extrapolated or interpolated position is output as the new position.

In some embodiments, the information stored in the ground feature database is pre-processed to match the native or raw format of the information from the downward facing sensor. For example, since a Lidar system returns distances, in some Lidar embodiments, the ground feature database stores distance datasets (e.g., where a distance dataset is a set of distances to some position in the air). By having the information in the ground feature database match the native format of the information from the downward facing sensor, there is no need to transform data prior to the comparison at step 104 in order to perform an "apples to apples" comparison which speeds up the process.

In some applications, an aircraft already includes a Lidar system or camera (or other video and/or image-taking device) and so the navigation techniques described herein require no new or additional equipment on the aircraft. For example, suppose that an aircraft (such as a drone) already comes equipped with a Lidar system, for example because the drone is used to survey things on the ground and/or construct topological maps. In addition to those applications, the Lidar measurements may also help the aircraft determine its in-air position. In some cases, an aircraft already comes equipped with a camera, for example to take pictures of things on the ground. In addition to saving pictures for later use, the pictures may also help the aircraft to determine its in-air position. This eliminates the need to include a GPS system or other navigation equipment in the aircraft and keeps the weight of the aircraft down.

As described above, step 100 helps the in-air position be determined faster because only some of the information stored in the ground feature database is compared against the sampled or sensed information. The following figures illustrate an example in which one or more control settings (e.g., associated with steering the aircraft) are used to select information from the ground feature database to subsequently compare against the sampled or measured data.

FIG. 2 is a diagram illustrating an embodiment of control settings which may be used to determine a new area in a ground feature database to search. In the example, an aircraft (e.g., battery powered drone) is being guided to fly in a certain direction. Based on the control settings, the latitude, longitude, and altitude of the aircraft are each expected to increase, stay (substantially) the same, or decrease (e.g., independently of each other). For example, if the aircraft is instructed to hover, then the latitude, longitude, and altitude are all expected to remain substantially the same.

Diagram 200 shows all 27 possible combinations of control settings and diagram 202 shows the legend for each entry. Although some combinations of control settings may not be possible for some types of aircraft, all 27 possible combinations of control settings are shown herein for completeness.

In some embodiments, based on the current direction an aircraft is instructed to fly in (e.g., obtained from and/or represented by the control settings), the corresponding expected change (if any) in latitude, longitude, and altitude from diagram 200 is selected. For example, if the aircraft is heading due north (without ascending or descending), the latitude is expected to increase and the longitude and altitude are expected to remain the same. Thus, in some embodiments, the control settings in combination with the last detected position are used to select a new area (e.g., data measured or captured from in-air positions which are consistent with the last detected position and control settings) at step 100 in FIG. 1. The following figure shows this more formally in a flowchart.

Figure 3:
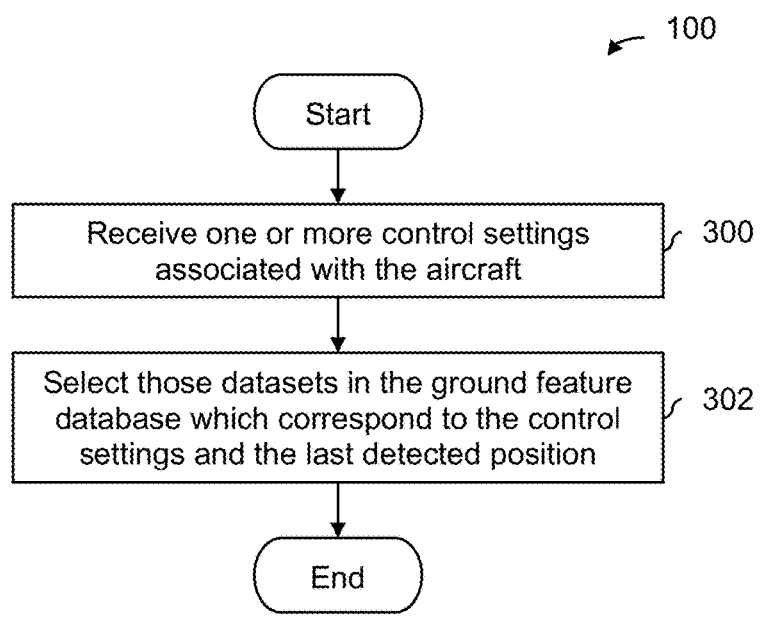
FIG. 3 is a flowchart illustrating an embodiment of a process to determine a new area to search in a ground feature database using one or more control settings of the aircraft.

FIG. 3 is a flowchart illustrating an embodiment of a process to determine a new area to search in a ground feature database using one or more control settings of the aircraft. In some embodiments, the process of FIG. 3 is used at step 100 in FIG. 1.

At 300, one or more control settings associated with the aircraft are received. For example, control settings associated with blade or propeller angles of attack, tail rudders, wing flaps, engine power levels, motor speeds, etc. may be received and mapped to one of the values shown in diagram 200 in FIG. 2. In some embodiments, this mapping is performed using some lookup table.

At 302, those datasets in the ground feature database which correspond to the control settings and the last detected position are selected. For example, as will be described in more detail below, each dataset may be a distance dataset measured from some known in-air position. Suppose that the last detected latitude and longitude are 37.3861° N and 122.0839° W and the last detected altitude is 100 feet. If the aircraft (e.g., a drone) is heading due north without being instructed to ascend or descend, then only the latitude is expected to increase. In this example, those datasets associated with in-air positions with a latitude of 37.3861° N or greater, a longitude of 122.0839° W ($\pm\Delta_1$, where $\Delta_1$ is some relatively small amount to account for wind and/or drifting of the aircraft), and an altitude of 100 feet ($\pm\Delta_2$, where $\Delta_2$ is some relatively small amount, again to account for wind and/or drifting of the aircraft) are selected. That way, instead of comparing the measured or sensed data against the entire ground feature database, only part of the database is processed.

As described above, in various embodiments, a variety of downward facing sensors may be used. First, some embodiments are described where the downward facing sensor is a Lidar system where distances (e.g., between the aircraft and various points on the ground) are measured using a laser. Then, some embodiments are described where the downward facing sensor is a camera or other image-based sensor (e.g., which captures pixels where each pixel has a measured or sampled color).

Figure 4:
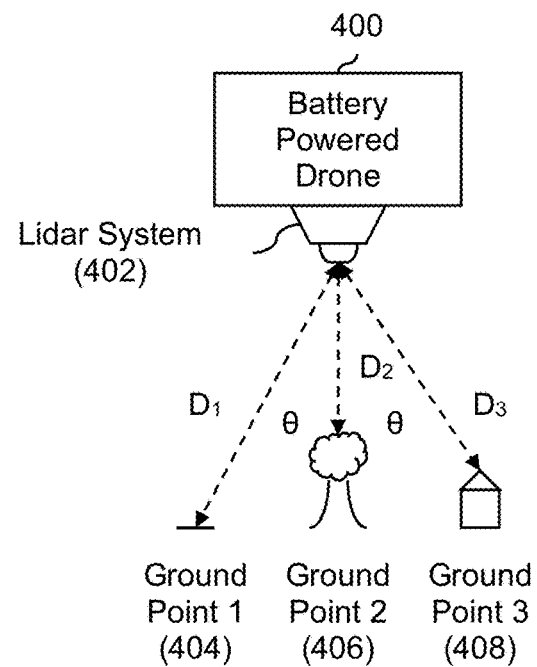
FIG. 4 is a diagram illustrating an embodiment of a battery powered drone which uses Lidar to determine its in-air position.

FIG. 4 is a diagram illustrating an embodiment of a battery powered drone which uses Lidar to determine its in-air position. In this example, a battery powered drone (400) has a Lidar system (402) on the bottom of the aircraft, where the Lidar system is downward facing. The drone makes multiple distance measurements to various points on the ground (referred to herein as ground points) using the Lidar system. In this example, the second ground point (406) is directly beneath the battery powered drone and such a ground point is sometimes referred to herein as a directly beneath ground point. Correspondingly, the associated distance (in this example, $D_2$) is sometimes referred to herein as the directly beneath distance.

In this example, a distance of $D_1$ is measured from the drone to the first ground point (404), a distance of $D_2$ is measured from the drone to the second ground point (406), and a distance of $D_3$ is measured from the drone to the third ground point (408). In this example, to obtain the measurements shown, Lidar system 402 measures a fixed angular offset ($\theta$ in the figure) from the directly beneath direction with respect to some fixed frame of reference. In this example, a side view is shown, and there are other distances measured by the Lidar system which are not shown in this figure. For example, suppose the first ground point (404) corresponds to $\theta$ degrees to the west (e.g., regardless of the orientation of the aircraft) and the third ground point (408) corresponds to $\theta$ degrees to the east. In addition to the ground points shown, distances may be measured using Lidar system 402 for $\theta$ degrees to the north and south for a fourth and fifth distance, respectively.

To obtain the other measurements (e.g., $\theta$ degrees to the north, south, east, and west), the drone may use one or more compasses to direct the Lidar system appropriately. Since different compass types have different performance characteristics in various flight environments (e.g., when the aircraft is accelerating and/or turning), the drone may have multiple compasses which are referred to in the appropriate flight environment. For example, a magnetic compass may be consulted when the aircraft is flying in a straight and level manner with no acceleration or deceleration. Alternatively, during a turn, a gyro-stabilized compass may be consulted.

The following figure illustrates an example of a distance dataset, which in some Lidar embodiments is stored in a ground feature database and is used to determine the in-air position of an aircraft.

FIG. 5 is a diagram illustrating an embodiment of two distance datasets stored in a ground feature database. In this example, each distance dataset is associated with five distances and/or ground points. Naturally, a distance dataset may include any number of elements and this number is merely exemplary and is not intended to be limiting.

In this example, distance dataset 500 is associated with a known position A (e.g., in the air). For example, the first known position might comprise a known latitude, known longitude, and known altitude. Distance $D^A_{0,0}$ is the directly beneath distance between known position A and the ground point directly beneath position A. Distance $D^A_{0,1}$ is the distance to a ground point north of the drone (aircraft), distance $D^A_{0,-1}$ is the distance to a ground point south of the drone (aircraft), distance $D^A_{-1,0}$ is the distance to a ground point west of the drone (aircraft), and distance $D^A_{1,0}$ is the distance to a ground point east of the drone (aircraft), all with respect to some fixed angular offset (i.e., $\theta$).

Distance data set 502 shows another distance dataset, this time with respect to known position B in the air. As before, there are five distances in the dataset (e.g., $D^B_{0,0}$, $D^B_{0,1}$, $D^B_{0,-1}$, $D^B_{-1,0}$, $D^B_{1,0}$) and each corresponds to the same ground points defined by a fixed angular offset (this time from in-air position B) as described above.

Some other systems may use measurements that are measured with respect to the aircraft, for example, towards the front (nose), back (tail), left wing, and right wing of the drone, regardless of the orientation of the aircraft. However, this would require additional transformations in order to map each measurement to a corresponding measurement in the ground feature database based on or to otherwise account for the current orientation of the aircraft (e.g., whether it is pointed due north, northwest, west, etc.). Since such transformations would need to be performed in real time (i.e., while the aircraft is trying to determine its in-air position) and determination of an aircraft's in-air position is a time sensitive matter, it is faster and more desirable for the distances to be measured with respect to a fixed orientation and for the ground feature database to store values with the same frame of reference or orientation. Such transformations also require additional power and/or processing resources.

It is noted that the orientation of distance datasets in a ground feature database may be selected as appropriate so that they match any quirks or characteristics of the equipment in the aircraft. For example, if the compass(es) used in an aircraft (e.g., which are used to adjust the Lidar system and measure the distances to the ground) are tuned to the magnetic North Pole as opposed to the true North Pole, then the orientation of distance datasets in a ground feature database may be with respect to the magnetic North Pole in order to match the Lidar measurements taken from the aircraft. Naturally, any other calibration and/or equipment specific issues may be matched (where possible) by the distance datasets in the ground feature database.

In some embodiments where Lidar is used, a ground feature database is populated (e.g., after some transformation) using open source Lidar topographical data. For example, OpenTopography (www.opentopography.org) provides access to free Lidar topographical data. The USGS makes its Lidar data available through its Earth Explorer portal (earthexplorer.usgs.gov) and NOAA makes its Lidar data available through its Data Access Viewer (www.coast.noaa.gov/dataviewer).

Topographical data is different from a distance dataset (e.g., because distance to a point in the air changes with the in-air position, but the topographical data is constant because it has no a point of reference), so Lidar topographical data is transformed into distance datasets (as an example) before being stored in a ground feature database. Consider, for example, a ground point at sea level (e.g., with no buildings, trees, or other objects on top of that ground point). In Lidar topographical data, that ground point would have a height or elevation of zero since that ground point is at sea level with no object on top of it. In contrast, in a distance dataset, the distance between that ground point and some in-air position is a non-zero value and would vary depending upon the in-air position.

In some embodiments, Lidar topographical data is transformed into distances using geometric and/or trigonometric relationships. For example, first, an in-air position is selected for which a distance dataset will be generated. Then, for a particular ground point (e.g., $D_{0,1}$ in FIG. 3), the topographical data point having the closest offset angle (e.g., if a line were drawn from the in-air position to the height or elevation at the specified latitude and longitude for a topographical data point) is selected. Then, the distance between the selected topographical data point and the in-air point is calculated. This distance is then stored in the ground feature database as part of that distance dataset. This process may be repeated to complete that distance dataset and then repeated for different in-air positions.

In this example, since it is assumed that the ground feature database is populated ahead of time and the calculations only need to be done once, it is acceptable to perform the above processing even though it may consume resources. This is because such resources may be readily available (e.g., since they do not need to be performed on the aircraft) and/or in real time.

Returning to FIG. 1, the following figures illustrate one example of how step 104 may be performed when a battery powered drone is using Lidar to measure distances.

Figure 6:
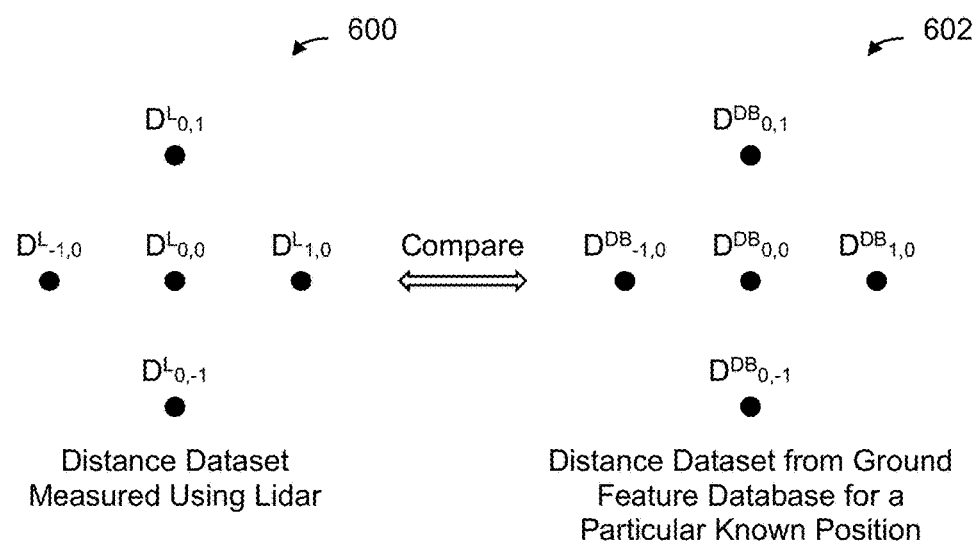
FIG. 6 is a diagram illustrating an embodiment of two distance datasets that are compared in order to obtain a similarity metric.

FIG. 6 is a diagram illustrating an embodiment of two distance datasets that are compared in order to obtain a similarity metric. In the example shown, distance dataset 600 is measured using Lidar. See, for example, FIG. 4 where Lidar system 402 measures distances of $D_1$, $D_2$, and $D_3$ between battery powered drone 400 and ground points 404, 406, and 408, respectively. Some other distances to other ground points not shown in that figure may also be measured. The other distance dataset (602) in this figure is associated with a known in-air position and is from the ground feature database. For example, it may be one of the distance datasets selected from the ground feature database based on the last detected position of the aircraft and the expected change in position based on the aircraft's control settings (see, e.g., FIG. 2 and FIG. 3).

Each of the distances in dataset 600 and dataset 602 is compared against its respective counterpart in the other dataset. For example, distance $D^L_{0,1}$ (from distance dataset 600; measured using Lidar) is compared against distance $D^{DB}_{0,1}$ (from distance dataset 602; from the ground feature database), distance $D^L_{-1,0}$ is compared against distance $D^{DB}_{-1,0}$, and so on.

In this example, a similarity metric or other numeric value representing the similarity (or, alternatively, difference) between the two datasets is generated based on this distance to distance comparison. For example, the sum of (e.g., absolute) differences between corresponding distances (e.g., ($D^L_{0,1}$ and $D^{DB}_{0,1}$), ($D^L_{1,0}$ and $D^{DB}_{1,0}$), ($D^L_{0,0}$ and $D^{DB}_{0,0}$), etc.) may be calculated. This process is repeated for multiple distance datasets in the ground feature database corresponding to a variety of in-air positions and the one with the lowest sum is selected. The in-air position corresponding to the selected distance dataset then becomes the (new) determined in-air position. The following figure shows this process more formally in a flowchart.

Figure 7:
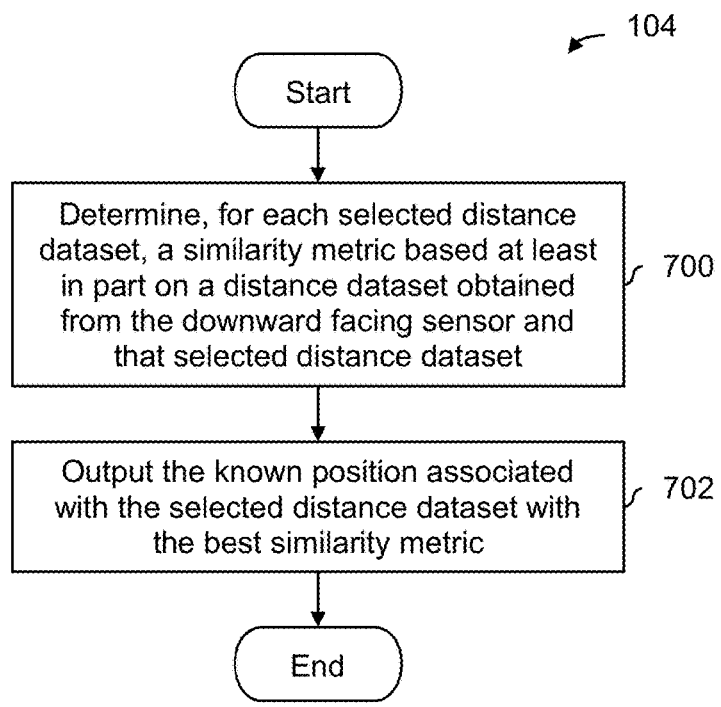
FIG. 7 is a flowchart illustrating an embodiment of a process to determine a new position using measured distances.

FIG. 7 is a flowchart illustrating an embodiment of a process to determine a new position using measured distances. In some embodiments, step 104 in FIG. 1 includes the process of FIG. 7.

At 700, for each selected distance dataset (e.g., selected at step 100 in FIG. 1), a similarity metric is determined based at least in part on a distance dataset obtained from the downward facing sensor and that selected distance dataset. If the process of FIG. 3 is used in combination with FIG. 7, step 700 is only performed on those distance datasets which are selected from the ground feature database per the process of FIG. 3.

In one example, the similarity metric calculated at step 700 is the sum of absolute differences between the members of the Lidar measured distance dataset and a given distance dataset in the ground feature database. Using distance datasets 600 and 602 in FIG. 6 as an example, the sum of differences for that example is:

$$\Sigma |\text{distance between } (D_{0,1}^L, D_{0,1}^{DB})| + |\text{distance between } (D_{-1,0}^L, D_{-1,0}^{DB})| + |\text{distance between } (D_{0,0}^L, D_{0,0}^{DB})| + \ldots$$

In some embodiments, a dedicated and/or specialized piece of hardware (e.g., an application specific integrated circuit (ASIC) or field programmable gate array (FPGA)) is used to calculate the sum of absolute differences (or, more generally, a similarity metric) at step 700. Since the aircraft will be constantly determining its changing in-air position, sums of absolute distances will need to be calculated over and over and quickly at that. A specially configured piece of hardware to perform this task will be able to calculate this value faster than some code running on a general purpose processor and will be used frequently enough to justify its inclusion on the aircraft.

At 702, the known position associated with the selected distance dataset with the best similarity metric is output. The resolution of the detected distance with this technique therefore depends on how close or dense the known in-air positions are (for which the ground feature database has an associated distance dataset). As described above, in some other embodiments, an interpolation is performed between known in-air positions (e.g., for which there is some measured data in the ground feature database) to obtain the new position.

In some embodiments, even if the process of FIG. 3 is used to limit the number of distance datasets subsequently compared against, the number of distance datasets processed is still quite high. The following figure illustrates an embodiment of a process to further limit the number of distance datasets.

Figure 8:
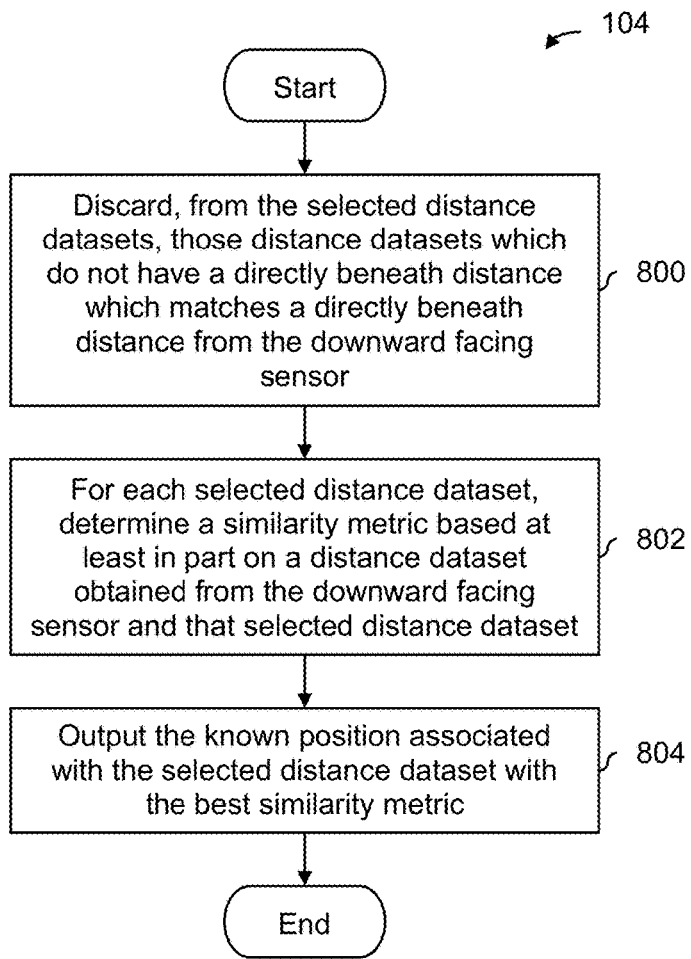
FIG. 8 is a flowchart illustrating an embodiment of a process to determine a new position using measured distances by discarding distance datasets which do not have a matching directly beneath distance.

FIG. 8 is a flowchart illustrating an embodiment of a process to determine a new position using measured distances by discarding distance datasets which do not have a matching directly beneath distance. In some embodiments, the process of FIG. 8 is used at step 104 in FIG. 1.

At 800, those distance datasets which do not have a directly beneath distance which matches the directly beneath distance from the downward facing sensor are discarded from the selected distance datasets. For example, control settings may be used first to eliminate certain distance datasets from the ground feature database from consideration (e.g., because they are associated with an in-air position which the aircraft was not directed to fly towards). Then, distance datasets from the ground feature database can be further narrowed or culled based on the directly beneath distance. In some embodiments, some margin may be used at step 800 so that distance datasets which have a directly beneath distance within some ±Δ of the measured directly beneath distance are selected.

At 802, for each selected distance dataset (e.g., after appropriate culling at step 800), a similarity metric is determined based at least in part on a distance dataset obtained from the downward facing sensor and that selected distance dataset. In comparison with step 700 in FIG. 7, step 802 has to calculate a similarity metric for fewer distance datasets which reduces the consumption of power and processing resources and reduces the amount of time to determine the in-air position.

At 804, the known position associated with the selected distance dataset with the best similarity metric is output. As with step 802, fewer distance metrics need to be examined or otherwise compared at step 804 in order to identify the best similarity metric.

The following figure illustrates an example of a system which performs one or more of the processes described above. In this example, to minimize the battery consumption of the exemplary battery powered drone, calculations associated with determining the in-air position of the battery powered drone are performed externally by another device.

Figure 9:
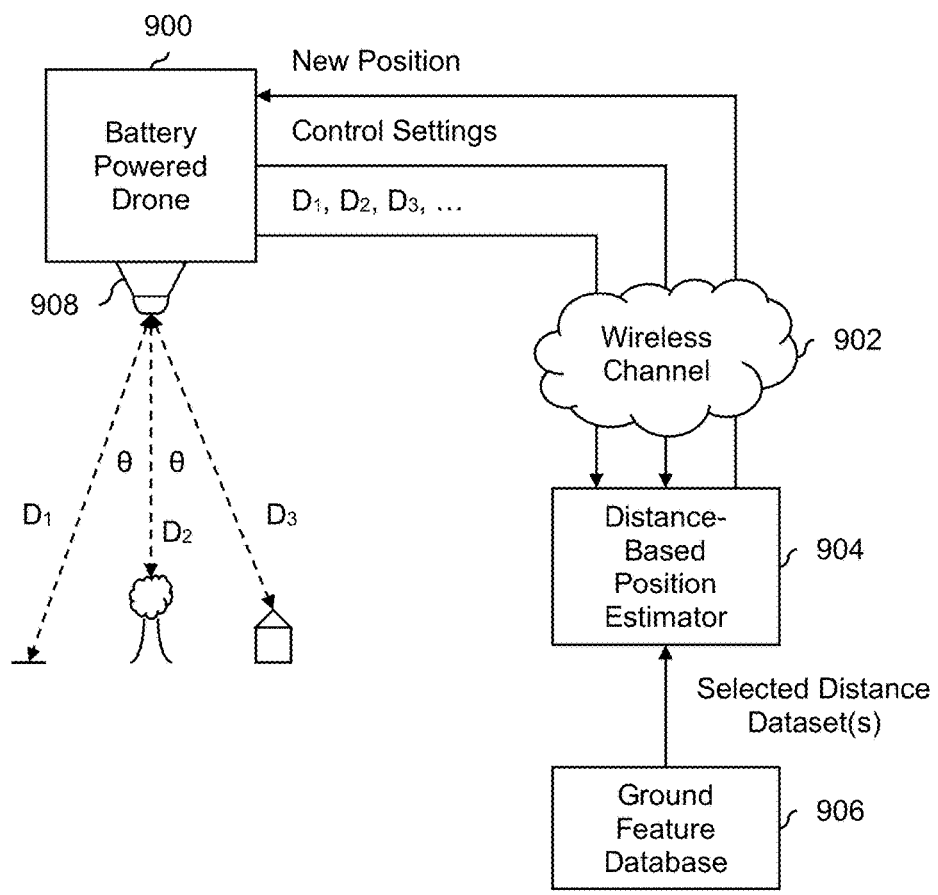
FIG. 9 is a diagram illustrating an embodiment of a distance-based position estimator which estimates the position for an aircraft.

FIG. 9 is a diagram illustrating an embodiment of a distance-based position estimator which estimates the position for an aircraft. In the example shown, to conserve the battery of battery powered drone 900, distance-based position estimator 904 estimates the position for battery powered drone 900. Using Lidar system 908, battery powered drone 900 measures distances (e.g., $D_1$, $D_2$, $D_3$, etc.) to various ground points. Battery powered drone 900 sends the distances, as well as one or more control settings (see, e.g., FIG. 2) to distance-based position estimator 904 via wireless channel 902.

In various embodiments, distance-based position estimator 904 comprises a variety of devices and wireless channel 902 can vary accordingly. For example, distance-based position estimator 904 may be a portable device which may travel with battery powered drone 900. For example, distance-based position estimator 904 may be part of some control panel which a pilot (e.g., on the ground and typically in view of the drone) uses to control an unmanned battery powered drone. In such embodiments, wireless channel 902 may be an infrared channel or an RF channel.

In other embodiments, distance-based position estimator 904 is a centralized server located remotely from battery powered drone 900 and which simultaneously estimates distances for multiple aircraft. In such embodiments, wireless channel 902 may include a cellular data network (e.g., LTE) and/or a wireless data network (e.g., WiFi).

Using the control settings and the distances, distance-based position estimator 904 narrows down the distance datasets from the ground feature database which are considered and/or processed. For example, per the process of FIG. 3, distance-based position estimator 904 may select those distance datasets which correspond to the direction in which battery powered drone 900 is directed to fly towards. Distance-based position estimator 904 may also discard or otherwise exclude from consideration those distance datasets which do not have a directly beneath distance which matches the directly beneath distance from the Lidar measurements (see, e.g., FIG. 8).

Then, distance-based position estimator 904 calculates a similarity metric (e.g., a sum of absolute differences) based on (1) each remaining distance dataset selected from ground feature database 906 and (2) the distance dataset measured using Lidar system 908. The known in-air position corresponding to the distance dataset from ground feature database 906 with the best similarity metric is then returned to battery powered drone 900 via wireless channel 902 as the new position of battery powered drone 900.

Lidar-based techniques to determine the in-air position of an aircraft (some embodiments of which were described above) perform better than image-based techniques in certain conditions. For example, in darkness, image-based techniques may not work. In contrast, Lidar can measure distances even when it is dark.

There are, however, cases where image-based techniques to determine the in-air position of an aircraft perform better than Lidar-based techniques. For example, if the aircraft is over flat ground where there are no differentiating or unique ground features (e.g., hills, valleys, buildings, bridges, etc.), then the Lidar-based techniques described above may not work. However, if the ground has some differentiating or unique visual features, then image-based techniques may work in some cases when Lidar-based techniques fail. Also, the equipment to generate the laser beams may be heavy and/or power hungry, which is unattractive in a battery powered aircraft. For these reasons, image-based techniques to determine an in-air position may in some cases be preferred over Lidar-based techniques.

The following figures describe some image-based embodiments to determine the in-air position of an aircraft. As described above, there may be some situations in which image-based techniques to determine the in-air position of an aircraft are preferred over Lidar or distance-based techniques.

Figure 10:
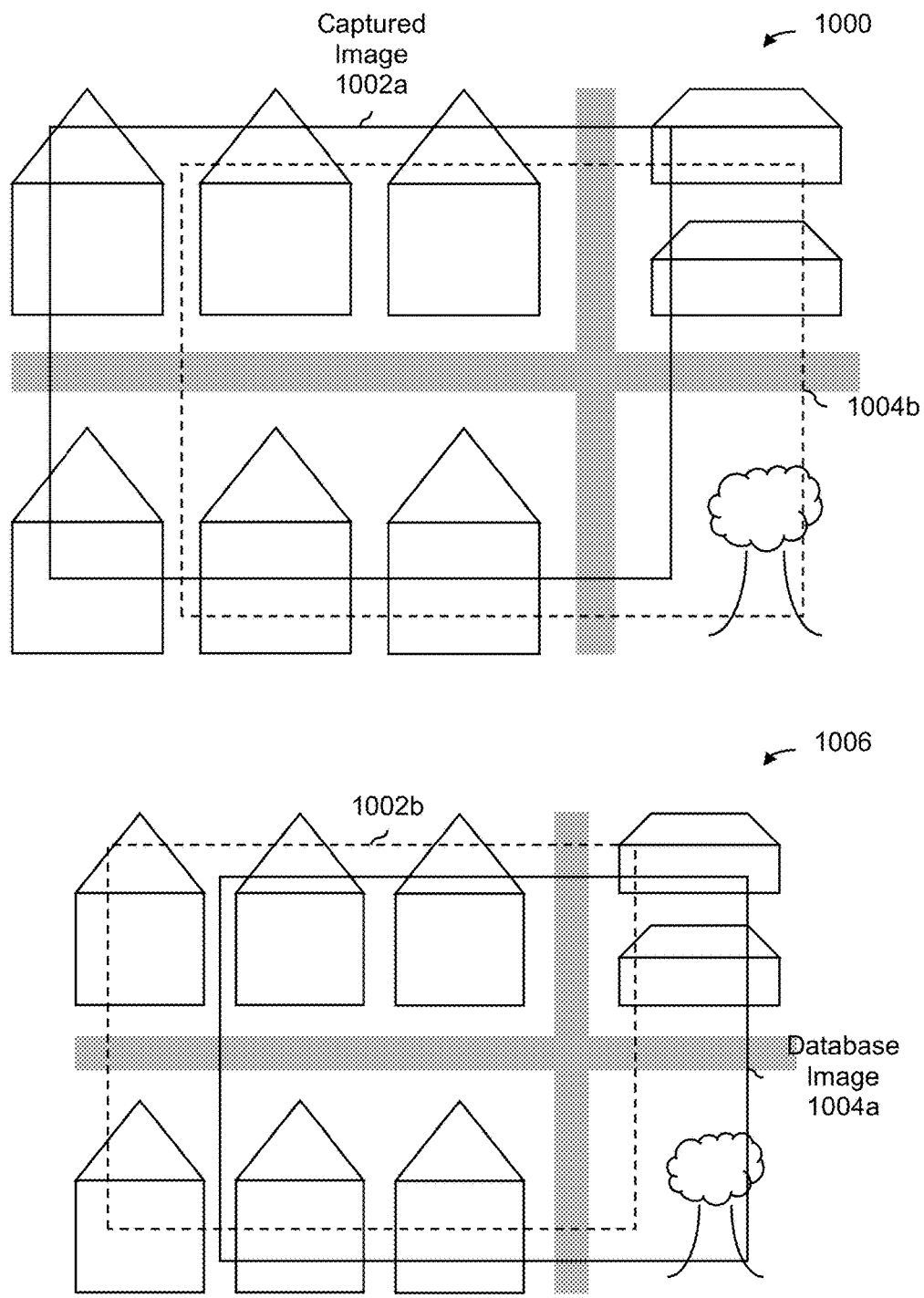
FIG. 10 is a diagram illustrating an embodiment of images used to identify the in-air position of an aircraft.

FIG. 10 is a diagram illustrating an embodiment of images used to identify the in-air position of an aircraft. In the example shown, diagram 1000 and diagram 1006 show an urban area (in this example which includes houses, commercial buildings, and a park) from a lower and higher altitude, respectively. Captured image 1002a in diagram 1000 shows an example of an image which is taken from an aircraft for which the in-air position is being determined. Dashed outline 1002b corresponds to captured image 1002a, but at the higher altitude of diagram 1006.

Database image 1004a in diagram 1006 shows an example of a reference image from a ground feature database. For example, the reference image may be either a publically-available or fee-based satellite image. In this example, the reference image is taken at a slightly different altitude than the reference image, so the sizes of the objects in the two images (e.g., the houses, the commercial buildings, trees in the park, etc.) are not the same. Also, the latitude and longitude at which the two images are taken is not the same (e.g., note that the two images have different centers. Dashed outline 1004b in diagram 1000 corresponds to database image 1004a but at the lower altitude of diagram 1000.

In this example, the two images (i.e., captured image 1002a and database image 1004a) are processed using optical flow. In at least some types of optical flow processing, the process identifies high contrast pixels or areas in the two images and matches those high contrast pixels or areas with a partner. In some cases, a high contrast area in one image does not have a counterpart high contrast area in the other image (e.g., because the high contrast area is not captured or otherwise present in the second image, or because the optical flow processing does not properly match them). However, generally speaking, the technique is relatively robust in the presence of noise (e.g., differences in the two images, such as cars which are present in one image and not present in the other image). From the pairs of matched high contrast areas, the change in the position from which the two images were taken can be determined. For example, the contrast between the dark asphalt of the roads and the lighter curb or sidewalk (not shown) next to the roads is relatively high contrast and may be used to find matching high contrast regions in the two images. Since the position from which the reference or database image (1004a) is taken is known, the new position from which the captured image (1002a) was taken can be determined. The following figure describes an example of this process more formally.

Figure 11:
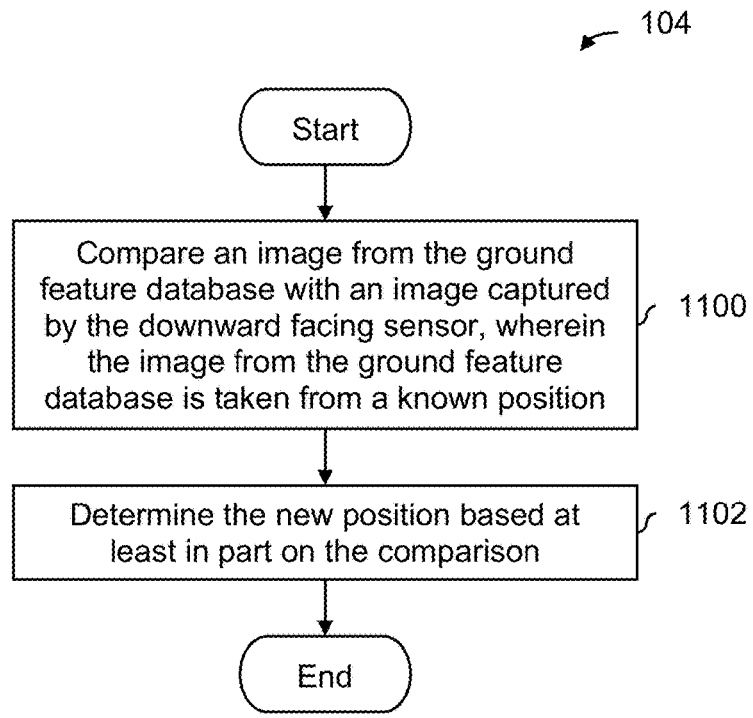
FIG. 11 is a flowchart illustrating an embodiment of a process to determine a new position using images.

FIG. 11 is a flowchart illustrating an embodiment of a process to determine a new positon using images. In some embodiments, step 104 in FIG. 1 includes the process of FIG. 11. Although optical flow was described above as a comparison technique, any appropriate image feature matching technique may be used.

At 1100, an image from the ground feature database with an image captured by the downward facing sensor are compared, wherein the image from the ground feature database is taken from a known position. For example, in FIG. 10, captured image 1002a and database image 1004a are examples of images which may be processed at step 1100. As described above, a comparison process may identify high contrast pixels or areas in the two images and matches them up (e.g., where possible) with a counterpart high contrast area in the other image.

At 1102, the new position is determined based at least in part on the comparison. For example, a shift or difference in the positions from which two images were captured is determined. Since the position from which the reference or database image was taken is known, the shift can be applied to the known position of the reference or database image in order to obtain the new position (e.g., from which the captured image was taken).

Naturally, with a large collection of images in a ground feature database, the captured image may be compared against multiple reference or database images. The following figure illustrates an example of how a new position may be determined when multiple reference or database images are used.

Figure 12:
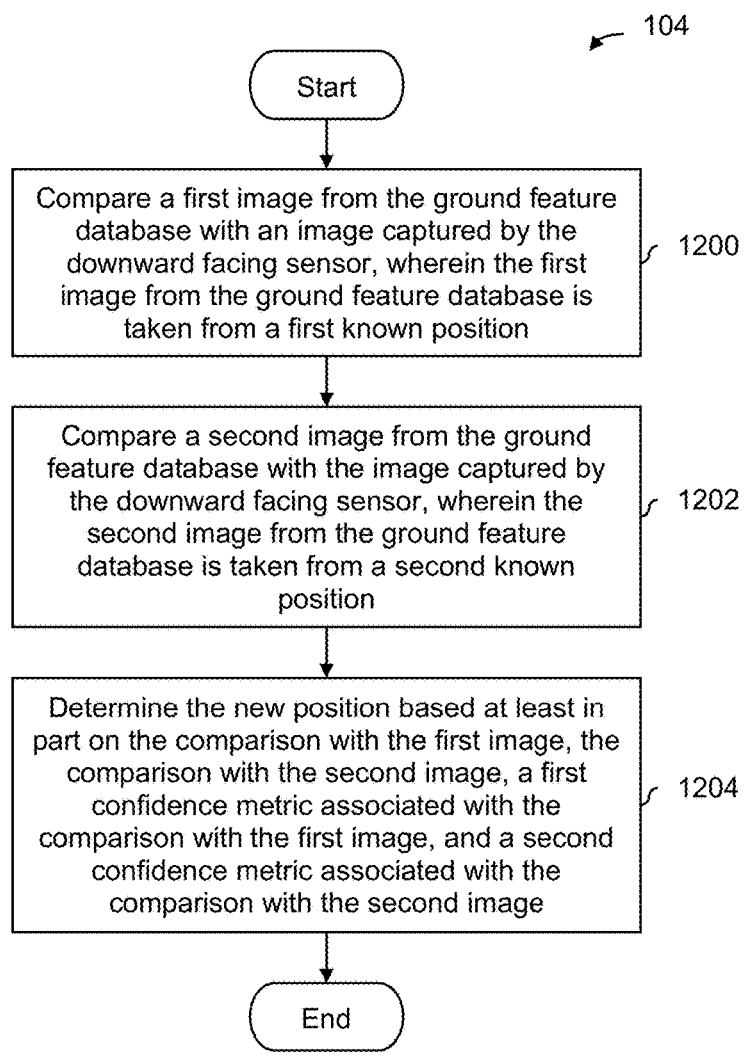
FIG. 12 is a flowchart illustrating an embodiment of a process to determine a new position using multiple reference images.

FIG. 12 is a flowchart illustrating an embodiment of a process to determine a new positon using multiple reference images. In some embodiments, step 104 in FIG. 1 includes the process of FIG. 12.

At 1200, a first image from the ground feature database is compared with an image captured by the downward facing sensor, wherein the first image from the ground feature database is taken from a first known position.

At 1202, a second image from the ground feature database is compared with the image captured by the downward facing sensor, wherein the second image from the ground feature database is taken from a second known position.

At 1204, the new position is determined based at least in part on the comparison with the first image, the comparison with the second image, a first confidence metric associated with the comparison with the first image, and a second confidence metric associated with the comparison with the second image. In this example, each comparison process (e.g., at step 1200 and 1202) outputs a confidence value which represents the confidence the comparison process has in its output or decision (e.g., about the shift or difference in positions from which the two images were taken). The confidence value may alternatively be called an error.

In some embodiments, the comparison with the better confidence value is used to determine the new position and the information from the other comparison (with the lower confidence value) is discarded at step 1204. In some applications this may be desired when the two confidence values are relatively far apart (e.g., if the difference between the two confidence values is greater than some difference threshold). Another scenario where this may be desirable is when both of the confidence values are both relatively poor (e.g., both confidence values are less than some poor confidence threshold). In this case, since neither one is good estimate of the new position, it may be better to just select the best one and hope the next iteration improves.

In some embodiments, the comparison results are combined together at step 1204. For example, if both of the confidences are relatively high (e.g., both are greater than some high confidence threshold), the two results may be averaged to produce a new position which at the mid-point of the two outputs or results.

Depending upon the time of day and time of year, the image (e.g., in the database and/or just captured) will vary. The following figure illustrates an example of a process to select an appropriate image from a ground feature database based on the time of day and time of year.

Figure 13:
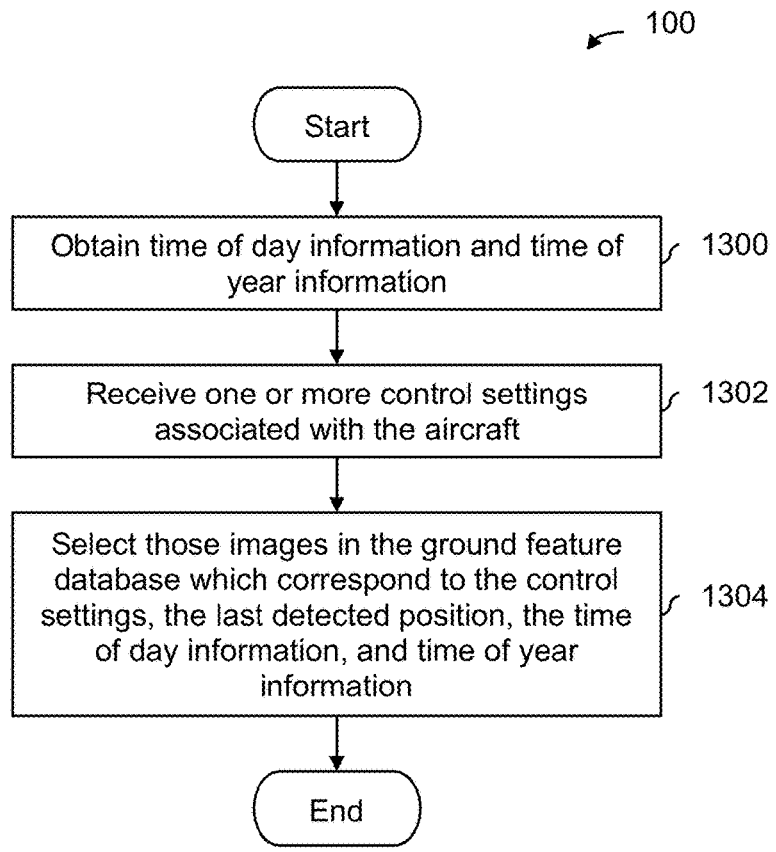
FIG. 13 is a flowchart illustrating an embodiment of a process to new area to search in a ground feature database based on a last detected position based at least in part on time of day information, time of year, and control information.

FIG. 13 is a flowchart illustrating an embodiment of a process to new area to search in a ground feature database based on a last detected position based at least in part on time of day information, time of year, and control information. In the example shown, the ground feature database includes images captured at a variety of times of day (e.g., at night, at dawn, mid-day, etc.) and at various times of year (e.g., spring, summer, etc.).

At 1300, time of day information and time of year information are obtained. In some embodiments, the time of day information obtained at step 1300 comprises a time of (e.g., at night, at dawn, mid-day, etc.) whereas in other embodiments the time of day comprises a specific time (e.g., 1:00 pm). Similarly, the time of year information may comprise a season (e.g., spring, summer, etc.) or a specific month and date (e.g., June 1).

At 1302, one or more control settings associated with the aircraft are received. As described above, the control settings may include orientation or positional information for steering equipment (e.g., from which it may be determined whether the latitude, longitude, and/or altitude are expected to increase, decrease, or remain (substantially) the same).

At 1304, those images in the ground feature database which correspond to the control settings, the last detected position, the time of day information, and seasonal information are selected.

The process of FIG. 13 permits reference or database images to be selected which better match the time of day and time of year of the image which was just captured from the aircraft. For example, depending on the time of year, the color of leaves or other foliage may be different (e.g., green versus red leaves, green versus brown grass, etc.). Similarly, depending upon the time of day, the shadows which are cast and/or the color of objects may be quite different. Or, if one image is taken at night and the other is taken at day, the nighttime image will only include light sources (e.g., street lights, headlights, etc.) and objects illuminated by those light sources. The daytime image will be very different since the sun is the light source. This is especially true in urban canyon environments where there are many tall buildings which cast shadows. Starting off with more similar images may improve the quality of the processing, resulting in a more accurate new position being determined.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
obtaining sensor information from a downward facing sensor coupled to an aircraft; and
determining a new position using the sensor information, including by:
obtaining directional information associated with the aircraft's direction of flight;
obtaining a previous position associated with the aircraft;
filtering a plurality of datasets in a ground feature database using the directional information and the previous position in order to obtain a reduced group of datasets, wherein each dataset in the ground feature database is associated with a known in-air position; and
comparing the sensor information against the reduced group of datasets in order to determine the new position.

2. The method recited in claim 1, wherein:
the downward facing sensor includes a Lidar system; and
each dataset in the ground feature database is associated with Lidar topographical data taken from a known in-air position.

3. The method recited in claim 1, wherein obtaining the directional information includes:
receiving one or more control settings associated with steering the aircraft; and
determining the directional information based at least in part on the control settings.

4. The method recited in claim 1, wherein obtaining the directional information includes:
receiving one or more control settings associated with steering the aircraft; and
determining the directional information based at least in part on the control settings, including by:
determining if the aircraft's latitude is expected to decrease, remain constant, or increase;
determining if the aircraft's longitude is expected to decrease, remain constant, or increase; and
determining if the aircraft's altitude is expected to decrease, remain constant, or increase.

5. The method recited in claim 1, wherein:
obtaining the sensor information includes receiving, at a position estimator, the sensor information from the aircraft;
determining the new position includes determining, at the position estimator, the new position, wherein the position estimator accesses the reduced group of datasets from the ground feature database; and
the method further includes sending, from the position estimator to the aircraft, the new position.

6. A system, comprising:
a processor; and
a memory coupled with the processor, wherein the memory is configured to provide the processor with instructions which when executed cause the processor to:
obtain sensor information from a downward facing sensor coupled to an aircraft; and
determine a new position using the sensor information, including by:
obtaining directional information associated with the aircraft's direction of flight;
obtaining a previous position associated with the aircraft;
filtering a plurality of datasets in a ground feature database using the directional information and the previous position in order to obtain a reduced group of datasets, wherein each dataset in the ground feature database is associated with a known in-air position; and
comparing the sensor information against the reduced group of datasets in order to determine the new position.

7. The system recited in claim 6, wherein:
the downward facing sensor includes a Lidar system; and
each dataset in the ground feature database is associated with Lidar topographical data taken from a known in-air position.

8. The system recited in claim 6, wherein the instructions for obtaining the directional information include instructions for:
receiving one or more control settings associated with steering the aircraft; and
determining the directional information based at least in part on the control settings.

9. The system recited in claim 6, wherein the instructions for obtaining the directional information include instructions for:
receiving one or more control settings associated with steering the aircraft; and
determining the directional information based at least in part on the control settings, including by:
determining if the aircraft's latitude is expected to decrease, remain constant, or increase;
determining if the aircraft's longitude is expected to decrease, remain constant, or increase; and
determining if the aircraft's altitude is expected to decrease, remain constant, or increase.

10. The system recited in claim 6, wherein:
the instructions for obtaining the sensor information include instructions for receiving, at a position estimator, the sensor information from the aircraft;
the instructions for determining the new position include instructions for determining, at the position estimator, the new position, wherein the position estimator accesses the reduced group of datasets from the ground feature database; and
the memory is further configured to provide the processor with instructions which when executed cause the processor to send, from the position estimator to the aircraft, the new position.

11. A computer program product, the computer program product being embodied in a non-transitory computer readable storage medium and comprising computer instructions for:
obtaining sensor information from a downward facing sensor coupled to an aircraft; and
determining a new position using the sensor information, including by:
obtaining directional information associated with the aircraft's direction of flight;
obtaining a previous position associated with the aircraft;
filtering a plurality of datasets in a ground feature database using the directional information and the previous position in order to obtain a reduced group of datasets, wherein each dataset in the ground feature database is associated with a known in-air position; and comparing the sensor information against the reduced group of datasets in order to determine the new position.

12. The computer program product recited in claim 11, wherein:
the downward facing sensor includes a Lidar system; and
each dataset in the ground feature database is associated with Lidar topographical data taken from a known in-air position.

13. The computer program product recited in claim 11, wherein the computer instructions for obtaining the directional information include computer instructions for:
receiving one or more control settings associated with steering the aircraft; and
determining the directional information based at least in part on the control settings.

14. The computer program product recited in claim 11, wherein the computer instructions for obtaining the directional information include computer instructions for:
receiving one or more control settings associated with steering the aircraft; and
determining the directional information based at least in part on the control settings, including by:
determining if the aircraft's latitude is expected to decrease, remain constant, or increase;
determining if the aircraft's longitude is expected to decrease, remain constant, or increase; and
determining if the aircraft's altitude is expected to decrease, remain constant, or increase.

15. The computer program product recited in claim 11, wherein:
the computer instructions for obtaining the sensor information include computer instructions for receiving, at a position estimator, the sensor information from the aircraft;
the computer instructions for determining the new position include computer instructions for determining, at the position estimator, the new position, wherein the position estimator accesses the reduced group of datasets from the ground feature database; and
the computer program product further includes computer instructions for sending, from the position estimator to the aircraft, the new position.

* * * * *

UNITED STATES PATENT AND TRADEMARK OFFICE
CERTIFICATE OF CORRECTION

PATENT NO. : 10,186,046 B2
APPLICATION NO. : 15/879186
DATED : January 22, 2019
INVENTOR(S) : Vawter et al.

Page 1 of 1

It is certified that error appears in the above-identified patent and that said Letters Patent is hereby corrected as shown below:

In the Specification

Column 7, Line 56, delete "$D^L{}_{1,0}$ and $D^{DB}{}_{1,0}$)" and insert --($D^L{}_{1,0}$ and $D^{DB}{}_{1,0}$)--, therefor.

Signed and Sealed this
Tenth Day of September, 2019

Andrei Iancu
*Director of the United States Patent and Trademark Office*